May 14, 1946.  J. F. LINDEN  2,400,241
CULTIVATING TOOL
Filed March 30, 1943
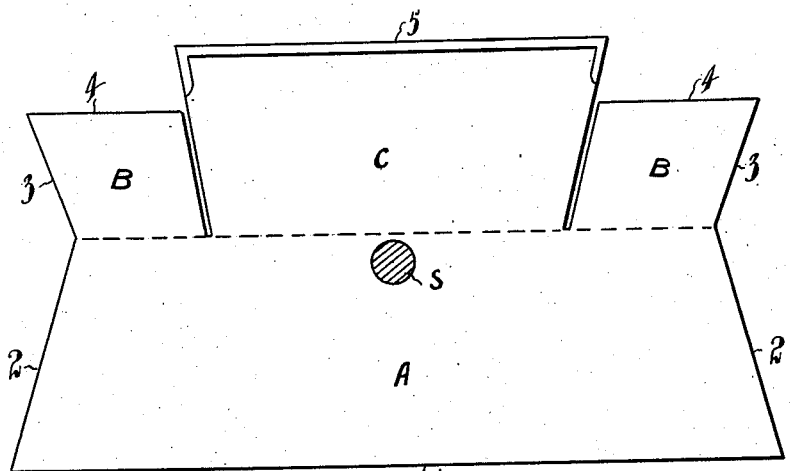
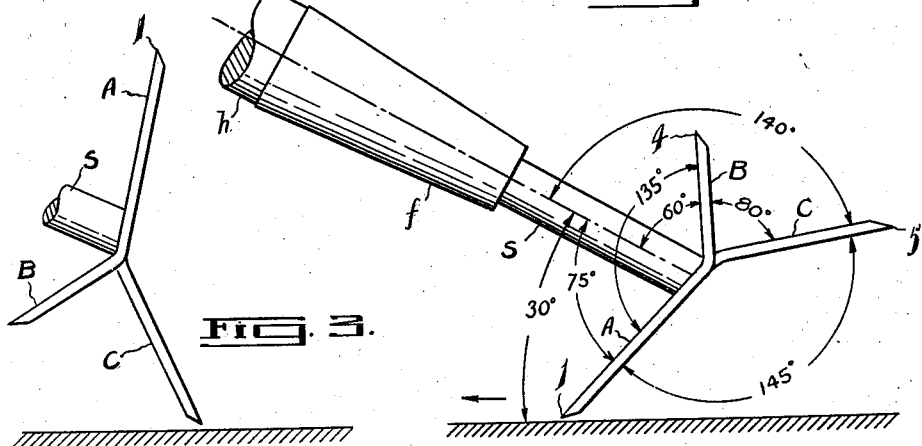
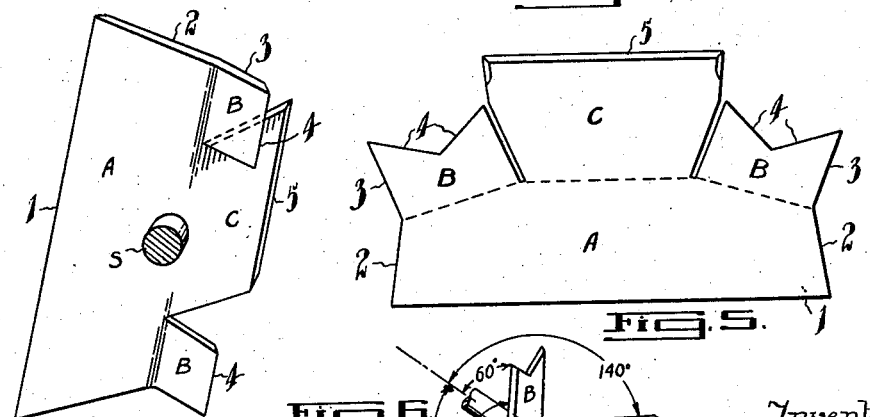
Inventor
J. F. Linden
by George P. Mackie
ATTY Patented May 14, 1946

2,400,241

UNITED STATES PATENT OFFICE 2,400,241

CULTIVATING TOOL

John F. Linden, Toronto, Ontario, Canada

Application March 30, 1943, Serial No. 481,175

3 Claims. (Cl. 97—66)

The object of this invention is to devise a hand cultivating tool which will combine a plurality of working-surfaces or blades in a manner that they may be used independently or in combination to perform a variety of operations, such for example, as cultivating the earth, cutting weeds, removing superfluous or undesirable plants from a bed or row, and other operations usually required in gardening, and particularly to so arrange said working surfaces or blades so said operations may be carried out with the greatest efficiency.

I attain my object by constructing the tool substantially as hereinafter described and illustrated in the accompanying drawing in which:

Fig. 1 is a plan view of the blank from which the tool is constructed and looking at the surface which will form the rear face of the tool;

Fig. 2 a side view of the completed tool in the working position it occupies when used for chopping and cultivating purposes;

Fig. 3 a side view of the tool in reversed working position in which it is used for levelling purposes;

Fig. 4 a rear view of the tool in the working position it assumes when using the end for weeding or plant thinning purposes;

Fig. 5 a plan view of a modified form of blank; and

Fig. 6 a side view of the tool made from the blank of Fig. 5.

In the drawing like numerals of reference indicate corresponding parts in the different figures.

The preferred form of the tool, which is illustrated in different working positions in Figs. 2, 3, and 4 is constructed from the blank shown in Fig. 1. This blank is provided with a shallow V-shaped recess at each end, and the line connecting the bottoms of the recesses is utilized as a bending line. The whole of that part of the blank at one side of the bending line serves as the main chopping or cultivating blade A, of which 1 is the main cutting edge, while that part of the blank at the other side of the bend line is divided to form a pair of spaced wing blades B, and an intermediate or central blade C.

The intermediate blade C is inclined forwardly relative to the plane of the main blade A, while the wing blades are inclined rearwardly, as will be evident from Fig. 2. It will be noted that the blade C has its working edge 5 bevelled on the rearward face, while the wing blades B have their front working edge bevelled on the forward face, as will be apparent from Fig. 2.

The tool is preferably formed from a single piece of sheet metal and is provided with a handle $h$, which by means of a ferrule $f$ is fitted to a shank $s$ projecting from the rear face of the main blade A. The method of securing the handle to the tool is not important, although its angle of inclination to the rear face of the blade A, and also to the other blades is quite important to obtain best results in use. As will be seen from Fig. 2, the axis of the handle lies at approximately 75° to the rear face of the main blade A, and at approximately 60° to the rear face of the wing blades B and 140° to the rear face of the intermediate blade C. From this it follows that the rear faces of the wing blades B lie at approximately 135° to the rear face of the main blade A, while the forward face of the intermediate blade C lies at approximately 145° to the forward faces of the blades B and the rear faces of the blade C lie at approximately 80° to one another.

It will also be seen from Fig. 2 that when the handle is inclined at an appropriate angle relative to the ground for operating the tool effectively, the position of the wing blades will be substantially vertical, this rigid position rendering the said blades inactive when not in actual use and therefore not interfering with the use of the cutting edge 1 of the main blade.

Here, it should be noted, that the large transverse space between the wing blades basing the larger center blade C, provides an ample space for the unobstructed escape of the dirt and cut material loosened by a rearward stroke of the main cutting edge of the chopping blade, which also will be the case if the tool is in the position indicated by Fig. 4 for use of the side cutting edges 2 and 3 either in unison or alternately.

The cutting edge 1 as well as the end edges 2 of the main blade A are bevelled on the forward sides, while the outer side edge 3 of each of the wing blades is also bevelled on the forward side.

As stated above, Fig. 2 shows the tool in the position used in conducting ordinary hoeing operation, the blade A occupying a position relative to the handle closely approximating that of the blade of an ordinary hoe.

The blade C is adapted for levelling or smoothing off the surface of the soil, and is therefore termed a levelling blade. When in use it occupies a position as shown in Fig. 3, the operation being effected by a pushing movement of the tool away from the operator.

The wing blades are intended particularly for removing weeds or removing unwanted plants from the seed bed or row as in plant thinning, and when the tool is used for this purpose it will occupy substantially the position shown in Fig. 4, although it will work equally as well for this purpose with the other end downwards instead.

The tool may be inclined to either side as desired to enable the point of the wing blade formed by the meeting edges 3 and 4 or the point of the main blade formed by the meeting edges 1 and 2 to be used in narrow spaces or it may be used as shown with the edges 2 and 3 cooperating to guide plants into the angle to enable them to be cut off and removed.

Various modifications in the construction of the tool are possible. In Fig. 1, it will be noted that the bend line of the wing blades B, as well as the levelling blade C is arranged parallel to the cutting edge 1. In the modification shown in Fig. 5, the bend line for the blades B is arranged at a slight angle to that of the levelling blade C, and therefore these wing blades will be inclined outwardly as shown in Fig. 6, with the outer edge 3 a little ahead of the opposite inner edge. In this form, the edge 4 of each wing blade B is shown as V-shaped.

It is to be noted that the wing blades B, are of small size relative to the chopping blade and also comparatively small in relation to the intermediate or center blade C. The main function of these auxiliary blades is to cut weeds and plants in close proximity to others and in an early stage of growth, which requires careful and accurate cutting. As these wing blades are intended for finer work, they are not subjected to hard or rough wear, and therefore require little attention in the way of sharpening and therefore are subject to little wear.

When weeding and thinning row crops with an ordinary hoe, it is difficult to remove the cut and loosening plants and dirt in a direction away from the user of the tool, due to the inclined position of the hoe blade. As a result the side of the row remote from the user will be either neglected altogether or only poorly worked on. Even if with much care the cut plants and dirt are pushed away in the direction referred to, the oppositely inclined plane of the hoe blade renders the cutting edge inactive and leaves the weeds and superfluous plants only partly destroyed, and consequently subject to rapid regrowth.

The levelling blade C is an important feature of the invention, as it provides necessary means to overcome the difficulties just referred to. By engaging said blade with the ground and pushing the tool, the levelling blade is in a proper position for cutting action and to remove the cut material and level the ground between the rows of plants, and it will be noted that the wing blades B are disposed in a position to act as stops to prevent excessive digging in the ground of the levelling blade.

The construction of the tool head with the operating blades or elements, A, B, and C in the assembly described provides a device with a plurality of cutting edges having a wide selective range of directions of the cut, rendering the device also very adaptable for cutting tops or leaves and stalks of root crops, such as turnips, beets, mangolds, etc. while the roots are still standing in the ground.

It will be evident that the angles between the axis of the handle and the various cutting blades may be varied as described, to better fit the tool for particular crops, the angles indicated being only suggested as being suitable for general purposes.

What I claim as my invention is:

1. A cultivating tool comprising a plate head bent transversely to form at one side of the bend a chopping blade, the lower margin of which forms a main cutting edge, and at the other side of the bend a pair of spaced and rearwardly inclined wing blades, a centrally located blade projecting from its transverse base intermediate the wing blades, said center blade being disposed forwardly in a direction opposite and away from the wing blades, therewith positioning the former at an obtuse angle to the front face of the chopping blade and at substantially right angles to a plane aligned with the wing blades, handle securing means, and a manipulating handle fixed at an acute angle to the chopping blade and therewith at an obtuse angle to the forwardly disposed center blade.

2. In a cultivating tool, a plate head as defined in claim 1, and in which the forwardly disposed center blade is of a greater width transversely than the width of either of the wing blades.

3. In a cultivating tool, a plate head as defined in claim 1, and in which the center blade terminates forwardly with a transverse cutting edge bevelled from its rear face, and each of the wing blades being bevelled from the front face to form cutting edges.

JOHN F. LINDEN.